June 3, 1969  K. MONKEWITZ  3,448,250
CODED CARRIER WITH PNEUMATIC AND CAM ACTUATED READOUT
Filed Feb. 12, 1965

Inventor:
KURT MONKEWITZ
By Shoemaker and Mattare
Attys.

United States Patent Office 3,448,250
Patented June 3, 1969

3,448,250
CODED CARRIER WITH PNEUMATIC AND CAM ACTUATED READOUT
Kurt Monkewitz, Winterthur, Switzerland, assignor to Hans Muller, Erlenbach, Zurich, Switzerland
Filed Feb. 12, 1965, Ser. No. 432,161
Claims priority, application Switzerland, Feb. 27, 1964, 2,554/64
Int. Cl. G06c 23/08
U.S. Cl. 235—61.12                                       8 Claims

ABSTRACT OF THE DISCLOSURE

An arrangement in which control information is contained or stored in the pattern of openings through a carrier member. The openings may be in the form of slots of different lengths, and the information represented by these openings and the pattern of their locations, is read from the carrier member through a pneumatic system. A cam is integrally constructed with the carrier member and is situated at one edge of this carrier. Th cam contains regulating information by which the control information may be further regulated as a function of a predetermined parameter. A follower in contact with the cam reads the information stored by it. The combined information derived from the pneumatic system and the cam follower are transmitted to a regulator which correlates the information and provides the desired controlling and regulating signals.

---

This invention relates to control devices particularly for programme-controlled adjustment fittings.

The automation of processes often involves the opening and closing of adjustment members. These adjustment members may be valves, or they may be electrical assemblies which are switched on and off. One essential requirement is the constant following up of one or more measured values, i.e. adjustment after or according to a predetermined course. Within the framework of the whole programme the control and adjustment functions have a fixed time relationship with one another.

It is known that two separate devices such as programme discs or cards are required: one for the open-closed controls and the other for constant adjustment. The portion effecting the control may be a disc containing programme holes and the device cooperating with the adjuster may carry a cam. The division of the control and adjustment members into two separate components is obviously disadvantageous from the point of view of construction and above all of operating technique. The operators must, for example, always make sure that the two associated discs or the like are placed in the apparatus and that they are running in the correct timed relationship. Programming, i.e. the making of the discs or the like themselves, is also laborious.

The present invention aims to overcome these disadvantages by providing a unit which combines the functions of the control and adjustment members.

According to the invention, there is provided a control device comprising a programme carrier for determining the terminal positions of at least one movable member and means prescribing the desired value of a parameter, wherein the programme carrier and the said prescribing means form a unitary component.

The invention will now be described, by way of example, with reference to the accompanying drawings, in which.

Figures 1, 2:
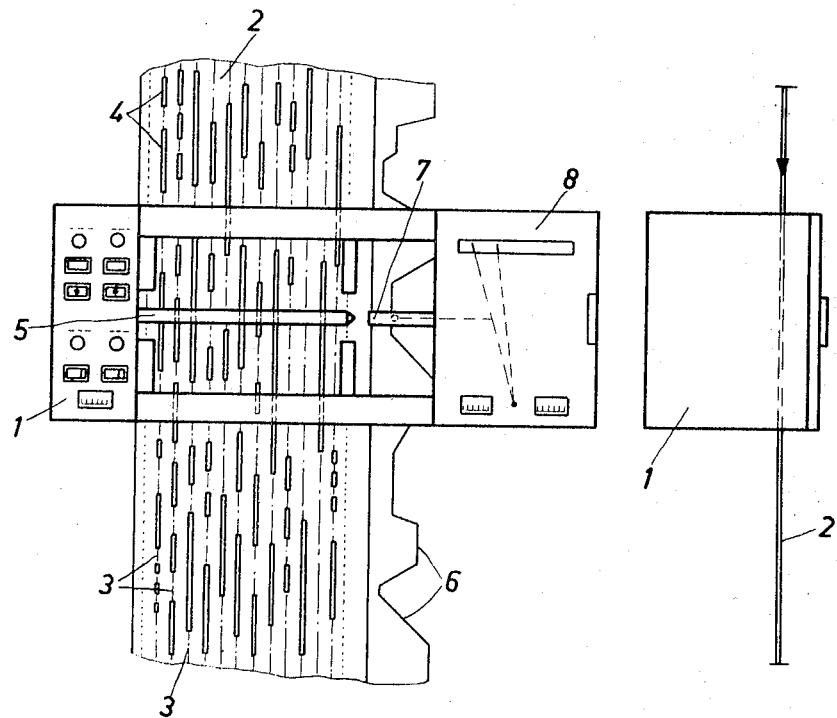
FIG. 1 is a front elevation of one example according to the invention.
FIG. 2 is a plan view of the example shown in FIG. 1.

Referring to FIGS. 1 and 2 of the drawings, the apparatus comprises a fixed frame 1 and a programme carrier in the form of a band or strip 2 adapted to be passed through said frame 1. The main, rectangular part of the carrier contains a number of tracks 3 in which the open-closed functions are programmed by punched apertures 4. A movable adjustment member (not shown) is associated with each track. The tracks of the programme carrier 2 and the apertures 4 are sensed by a pneumatic jet or nozzle system 5.

The right hand edge of the programme carrier 2 is provided with a cam 6 which prescribes or lays down the course of a measured parameter such as a temperature. The cam is sensed by a lever 7 which in turn automatically transmits a time variable value, to a regulator 8 mounted in or on or built into or onto the frame 1. An automatic programme machine with the prescribed combined programme carrier 2 as illustrated in FIGS. 1 and 2 fulfills the aim that the regulating and control functions should be carried out simultaneously on the basis of a single programme carrier.

Figure 3:
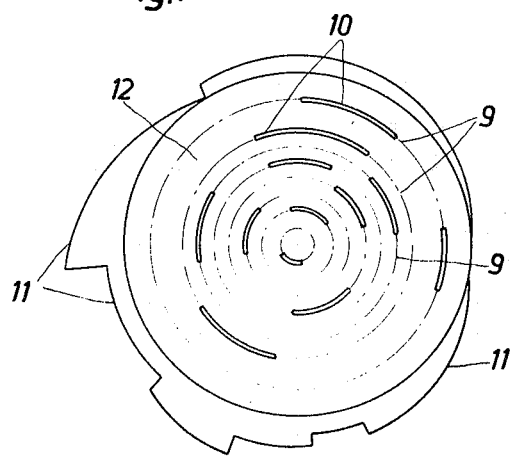
FIG. 3 shows a unitary component for a second example according to the invention.

Turning now to the second example of the invention which is illustrated in FIG. 3, the programme carrier in this case comprises a circular disc with its surface divided into individual concentric tracks 9. The openings 10 in these tracks carry out the open-closed functions in a similar manner to the apertures 4 in the carrier 2, while the circular peripheral edge of the disc is provided with a continuous regulating programme in the form of a cam 11. A frame is provided in which the disc can rotate and sensing means similar to the jet system 5 and lever 7 are provided for the tracks 9 and cam 11 respectively.

Although the invention has been described with reference to pneumatic sensing means, the control functions may alternatively be sensed mechanically, electrically, electronically or optically. Combinations of these sensing methods may also be used, one method being employed for control and another for picking up the nominal regulating cam. The programme carrier may be advanced constantly or in stages. In the latter case the intervals of time between the stages can advantageously be determined by individual adjustable time-signal transmitters. It is possible for the programme carrier to be advanced partly continuously and partly intermittently in such a way that the advance is during a period where there is no change of programme.

If desired, a plurality of different programme carriers according to the invention may be used in one frame according to the invention. The carriers may also be made so that they are interchangeable.

Other modifications and embodiments are envisaged without departing from the scope of the invention as defined by the appended claims.

I claim:
1. A control arrangement comprising, in combination, program carrier means carrying information stored in openings through said carrier means, said openings being arranged in a predetermined pattern on said carrier depending upon the information content to be stored by said carrier means; pneumatic means mounted opposite said openings in said carrier means and cooperating with said openings to sense the information stored by said holes in said carrier means; cam means integrally constructed with said program carrier means and being shaped to possess regulating information as a function of a predetermined parameter; follower means in contact with said cam means for sensing said regulating information associated with said cam means; and regulator means receiving the stored information sensed by said pneumatic means and the regulating information sensed by said follower means, said regulator correlating said information for deriving controlling signals based on said information.

2. The control arrangement as defined in claim 1, wherein said program carrier comprises a strip-shaped member movable along its longitudinal axis; and guide and support means through which said strip-shaped member passes for sensing by said pneumatic means.

3. The control arrangement as defined in claim 1, wherein said program carrier comprises a substantially circular disc means rotatable about a fixed axis; and supporting means for rotatably supporting said circular disc means and being adapted to cooperate with said pneumatic means so that the latter may sense the openings on said circular disc means in the rotation thereof.

4. The control arrangement as defined in claim 1 including operating means for maintaining said program carrier means in continuous motion while sensing said information by said pneumatic means.

5. The control arrangement as defined in claim 1 including operating means for moving said program carrier means in stages at predetermined intermittent periods of time.

6. The control arrangement as defined in claim 1 including operating means for moving said program carrier means partially continuously and partially in stages at intermittent periods of time.

7. The control arrangement as defined in claim 1, wherein said openings on said program carrier are arranged in a plurality of tracks, each track having a sequence of openings, the size and pattern of said openings determining the information stored by said track.

8. The control arrangement as defined in claim 1, wherein said program carrier means is a member of uniform thickness whereby said openings through said carrier means are all of the same depth.

References Cited

UNITED STATES PATENTS

| 1,747,037 | 2/1930 | Tschopp | 235—61.11 |
| 1,965,122 | 7/1934 | Kardorff | 340—358 |
| 3,047,663 | 7/1962 | Zimmerman | 179—6 |
| 3,069,570 | 12/1962 | Abadie | 179—100.2 |
| 3,100,299 | 8/1963 | Congdon | 340—347 |

OTHER REFERENCES

Knox: "Magnetic Vernier for Shaft Digitizer," IBM Technical Disclosure Bulletin, vol. 2, No. 3, October 1959, pages 18 &19.

Beattie et al.: "Deserializer, Storage and Translating Device," IBM Technical Disclosure Bulletin, vol. 6, No. 4, September 1963, pages 15 & 16.

MAYNARD R. WILBUR, *Primary Examiner.*

THOMAS J. SLOYAN, *Assistant Examiner.*